(12) United States Patent
Tarumi et al.

(10) Patent No.: US 10,532,514 B2
(45) Date of Patent: Jan. 14, 2020

(54) THREE-DIMENSIONAL SHAPING METHOD (71) Applicant: Matsuura Machinery Corporation, Fukui, Fukui (JP)

(72) Inventors: Satoru Tarumi, Fukui (JP); Jun Kobayashi, Fukui (JP)

(73) Assignee: Matsuura Machinery Corp., Fukui, Fukui (JP)

( * ) Notice: Subject to any disclaimer, the term of this patent is extended or adjusted under 35 U.S.C. 154(b) by 0 days.

(21) Appl. No.: 16/284,387

(22) Filed: Feb. 25, 2019

(65) Prior Publication Data
US 2019/0283324 A1 Sep. 19, 2019

(30) Foreign Application Priority Data

Mar. 19, 2018 (JP) ................. 2018-051320

(51) Int. Cl.
*B29C 64/30* (2017.01)
*B29C 64/153* (2017.01)
*B23C 3/12* (2006.01)
*B33Y 10/00* (2015.01)
*B29C 64/188* (2017.01)
*B33Y 40/00* (2015.01)
*B29C 59/02* (2006.01)

(52) U.S. Cl.
CPC ............ *B29C 64/30* (2017.08); *B23C 3/12* (2013.01); *B29C 64/153* (2017.08); *B29C 64/188* (2017.08); *B33Y 10/00* (2014.12); *B23C 2220/16* (2013.01); *B23C 2228/49* (2013.01); *B23C 2270/20* (2013.01); *B29C 2059/027* (2013.01); *B33Y 40/00* (2014.12)

(58) Field of Classification Search
CPC ..................................... B29C 64/30
See application file for complete search history.

(56) References Cited

FOREIGN PATENT DOCUMENTS

| JP | 2003-159755 A | 6/2003 |
| JP | 2004-002957 A | 1/2004 |
| JP | 2004-506097 A | 2/2004 |
| JP | 2008-291315 A | 12/2008 |
| JP | 2017-144446 A | 8/2017 |

OTHER PUBLICATIONS

Dictionary of Mechanical Terms, Nikkan Kogyo Shimbun, Ltd., Nov. 28, 1997, 1st ed.

*Primary Examiner* — Larry W Thrower
(74) *Attorney, Agent, or Firm* — Richard M. Goldberg (57) ABSTRACT A three-dimensional shaping method including the steps, after a lamination step, in which steps of forming a powder layer, flattening with a squeegee and sintering are repeated, followed by cutting of the surface of the laminate, 1. setting the overall shape of an object to be shaped by a CAD/CAM system, and setting machining units that form the overall shape and cutting allowances on peripheral sides and upper sides of each of the machining units, 2. cutting of the peripheral sides and upper sides according to a prescribed order, after lamination with addition of a cutting allowance on the peripheral sides of each machining unit, and after carrying out lamination to the thickness of the cutting allowance on the upper side of the machining unit and the machining unit adjacent above the machining unit, and 3. continuing repetition of step 2, from the lowest to the topmost machining unit.

21 Claims, 4 Drawing Sheets

THREE-DIMENSIONAL SHAPING METHOD

TECHNICAL FIELD

The present invention relates to a three-dimensional shaping method that assumes provision of a cutting allowance on a cutting surface.

BACKGROUND OF THE INVENTION

Cutting allowance, also known as machining allowance, is defined as surplus dimensions provided in advance in a material to allow finishing to the prescribed dimensions in cutting (see, for example, "Dictionary of Mechanical Terms," Nikkan Kogyo Shimbun, Ltd., Nov. 28, 1997, First Printing of First Edition).

It is also possible to provide cutting allowance for objects that are to be shaped by three-dimensional shaping methods.

With three-dimensional shaping methods, however, it is indispensable to carry out a cutting step for the cutting allowance, after having added a lamination step for the cutting allowance by repeating several times the process of formation of a powder layer, flattening of the powder layer with a squeegee and sintering by irradiation with a laser beam or electron beam.

Nevertheless, reasonable objective standards have not been determined for such three-dimensional shaping methods, in terms of setting the cutting allowance in the lamination step and setting the order for the subsequent cutting steps.

Patent Document 1, incidentally, describes reduction in the amount of cutting allowance in three-dimensional shaping, but does not describe in any way setting the cutting allowance for the lamination step or setting the order for the subsequent cutting steps.

Moreover, no published technical literature can be found discussing at what stages cutting should be carried out after lamination in which the cutting allowance is added, in order to accomplish efficient and accurate shaping.

PRIOR ART DOCUMENT

Patent Document

[Patent Document 1] Japanese Published Unexamined Patent Application No. 2017-144446

SUMMARY OF INVENTION

Technical Problem

It is an object of the present invention to provide a three-dimensional shaping method which assumes setting of a cutting allowance on the cutting surface based on efficient and reasonable steps in the three-dimensional shaping method.

Solution to Problem

In order to achieve the aforementioned object, the present invention includes following three basic configurations I, II, III.

I. A three-dimensional shaping method wherein, after a lamination step that includes several repetitions of forming a flat surface by sliding of a squeegee onto a powder layer formed by dispersion of powder and a sintering step in which the flat surface is irradiated with a laser beam or electron beam, the laminate is subjected to cutting with a cutting tool, the three-dimensional shaping method employing the following steps.

1(1). Setting the overall shape of the object to be shaped by a CAD/CAM system, and setting machining units that form the overall shape and each equips a lateral periphery that is to be cut with a cutting blade on a lengthwise side section of the cutting tool, and an upper side that is to be cut with a cutting blade at the tip of the cutting tool and is surrounded by all or portions of the peripheral sides.

(2). Setting a cutting allowance for each machining unit by a thickness "a" on the lateral periphery, and setting a cutting allowance by a thickness "b" on the upper sides.

2(1). Continuing lamination by addition of the thickness "a" in the horizontal direction on the peripheral sides of the machining unit located on the lower end, until reaching the upper side of the machining unit.

(2). Continuing lamination based on the addition of (1) on the machining unit of (1) and a machining unit located adjacent to and above the machining unit in the horizontal direction, in the region of the thickness in the direction of the upper sides.

Or, when no machining unit is present adjacent to the machining unit of (1), continuing lamination based on the addition of (1) only in the machining region of (1), in a region of the thickness "b" in the direction of the upper side.

(3). Cutting the cutting allowance of the thickness "a" on the peripheral sides of the machining units of (1) and (2) and cutting the cutting allowance of the thickness "b" on the upper side.

While in the region where the peripheral side of (1) and the adjacent peripheral sides of (2) are continuous, cutting the cutting allowance of the thickness "a" on both peripheral sides.

3. Continuing repetition of step 2 from the lowest machining unit to the topmost machining unit.

II. A three-dimensional shaping method wherein, after a lamination step that includes several repetitions of forming a flat surface by sliding of a squeegee onto a powder layer formed by dispersion of powder and a sintering step in which the flat surface is irradiated with a laser beam or electron beam, the laminate is subjected to cutting with a cutting tool, the three-dimensional shaping method employing the following steps.

1(1). Setting the overall shape of the object to be shaped by a CAD/CAM system, and setting machining units that form the overall shape and each equips a lateral periphery that is to be cut with a cutting blade on a lengthwise side section of the cutting tool, and an upper side that is to be cut with a cutting blade at the tip of the cutting tool and is surrounded by all or portions of the peripheral sides.

(2). Setting a cutting allowance for each machining unit by a thickness "a" on the lateral periphery, and setting a cutting allowance by a thickness "b" on the upper side.

2(1). Continuing lamination by addition of the thickness "a" in the horizontal direction on the peripheral sides of the machining unit located on the lower end, until reaching the upper side of the machining unit.

(2). Continuing lamination based on the addition of (1) on the machining unit of (1) and a machining unit located adjacent to and above the machining unit in the horizontal direction, in the region of the thickness "b" in the direction of the upper side.

Or, when no machining unit is present adjacent to the machining unit of (1), continuing lamination based on the addition of (1) only in the machining region of (1), in a region of the thickness "b" in the direction of the upper side.

(3). Repeating steps (1) and (2), and continuing the repetition as long as the total length along the direction orthogonal to the horizontal direction of the peripheral sides formed by the repetition does not exceed the length of the cutting blade on the lengthwise side section of the cutting tool.

(4). Cutting the cutting allowance of the thickness "a" on the peripheral sides formed by step (3) and cutting the cutting allowance of the thickness "b" on the upper side.

3. Continuing repetition of step 2 from the lowest machining unit to the topmost machining unit.

III. A three-dimensional shaping method wherein, after a lamination step that includes several repetitions of forming a flat surface by sliding of a squeegee onto a powder layer formed by dispersion of powder and a sintering step in which the flat surface is irradiated with a laser beam or electron beam, the laminate is subjected to cutting with a cutting tool, the three-dimensional shaping method employing the following steps.

1(1). Setting the overall shape of the object to be shaped by a CAD/CAM system, and setting machining units that form the overall shape and each equips a lateral periphery that is to be cut with a cutting blade on a lengthwise side section of the cutting tool, and an upper side that is to be cut with a cutting blade at the tip of the cutting tool and is surrounded by all or portions of the peripheral sides.

(2). Setting a cutting allowance for each machining unit by a thickness "a" on the lateral periphery, and setting a cutting allowance by a thickness "b" on the upper side.

2(1). Continuing lamination by addition of the thickness "a" in the horizontal direction on the peripheral sides of the machining unit located on the lower end, until reaching the upper side of the machining unit.

(2). Continuing lamination based on the addition of (1) on the machining unit of (1) and a machining unit located adjacent to and above the machining unit in the horizontal direction, in the region of the thickness "b" in the direction of the upper side.

Or, when no machining unit is present adjacent to the machining unit of (1), continuing lamination based on the addition of (1) only in the machining region of (1), in a region of the thickness "b" in the direction of the upper side.

(3). Continuing repetition of the lamination of (1) and (2) from the lowest machining unit to the topmost machining unit.

3. Cutting the cutting allowance of the thickness "a" on the peripheral side and cutting the cutting allowance of the thickness "b" on the upper side of each machining unit, after using a cutting tool having a cutting blade at the lengthwise side section that is longer than the peripheral side with the longest continuous length in the direction orthogonal to the horizontal direction, of the peripheral sides formed in step 2.

Advantageous Effects of Invention

With any of the basic configurations I, II, III, it is possible to carry out three-dimensional shaping that allows efficient cutting without waste, by cutting on the peripheral sides and the upper sides after setting the cutting allowances, in steps 1, 2 and 3.

This effect is also clear from the fact that, on the peripheral sides and upper sides, for example, when cutting has been carried out at a stage before completing lamination of the cutting allowance with the thickness "a" on the peripheral sides and the thickness "b" on the upper sides, as in each step 2(2) of the basic configurations I, II, III, there is a need for an extra step requiring further cutting due to further lamination of a cutting allowance that has been preset by a CAD/CAM system.

BRIEF DESCRIPTION OF DRAWINGS

FIGS. 1(a)-1(e) are lateral cross-sectional views of the production process of the basic configuration I, wherein FIG. 1(a) shows an object to be shaped by step 1, each machining unit composing the object to be shaped, and cutting allowances on the peripheral sides and upper sides (the dotted regions represent regions of the object to be shaped formed by the machining units, the hatching regions represent cutting allowances, the Roman numerical symbols indicate demarcations of the machining units, and the dash-dot lines indicate the surfaces of the vertical demarcations between the machining units, same hereunder)

FIGS. 2(a)-2(f) are lateral cross-sectional views of the production process of the basic configuration II, wherein FIG. 2(a) shows an object to be shaped by step 1, each machining unit composing the object to be shaped, and cutting allowances on the peripheral sides and upper sides (the dotted regions represent regions of the object to be shaped formed by the machining units, the hatching regions represent cutting allowances, the Roman numerical symbols indicate demarcations of the machining units, and the dash-dot lines indicate the surfaces of the vertical demarcations between the machining units, same hereunder)

FIGS. 3(a)-3(f) are lateral cross-sectional views of the production process of the basic configuration III, wherein FIG. 3(a) shows an object to be shaped by step 1, each machining unit composing the object to be shaped, and cutting allowances on the peripheral sides and upper sides (the dotted regions represent regions of the object to be shaped formed by the machining units, the hatching regions represent cutting allowances, the Roman numerical symbols indicate demarcations of the machining units, and the dash-dot lines indicate the surfaces of the vertical demarcations between the machining units, same hereunder)

DESCRIPTION OF EMBODIMENTS

The basic premise of the present invention will be explained first, before describing the embodiments of the present invention.

As explained for the basic configurations I, II, III, the lamination step of the present invention includes several repetitions of formation of a powder layer, flattening of the powder layer with a squeegee, and sintering by irradiation with a laser beam or electron beam.

After the lamination step, cutting with a cutting tool 3 is performed on the laminated surface, the cutting surface is classified as either a peripheral side or the upper side, as described in each step of process 1.

Sides along the vertical direction are typical examples of peripheral sides, but instead of the sides along the vertical direction, they may also refer to surfaces that form slanted sides with respect to the vertical direction or curved sides due to outward protrusion, and that are to be cut by the cutting blade at the lengthwise side section of the cutting tool 3.

On the other hand, the upper sides are typically horizontal sides, but instead of the horizontal sides, they may also refer to surfaces that form slanted sides with respect to the horizontal direction or curved sides due to inward or outward protrusion, and that are to be cut by the cutting blade at the tip of the cutting tool 3.

FIGS. 1, 2, 3 show each process of the basic configurations I, II, III, FIG. 1 showing a case where all of the peripheral sides and the upper sides are sides along the vertical direction, FIG. 2 showing a case where most of the peripheral sides and upper sides are slanted sides, and FIG. 3 showing a case where the peripheral sides and upper sides at the highest location and the second highest location at the top are all outwardly protruding curved sides.

The machining units 11 described in step 1 of the basic configurations I, II, III are the units of lamination and cutting that form the overall shape of the object to be shaped 1, as shown by the regions demarcated by (i), (ii), (iii), (iv), (v) in (a) of FIGS. 1, 2, 3, and they have four peripheral sides, as well as upper sides surrounded by parts of the peripheral sides (the upper sides of (i), (ii), (iii) in (a) of each of FIGS. 1, 2, 3) or upper sides surrounded by all of the peripheral sides (the upper sides (iv), (v) in (a) of each of FIGS. 1, 2, 3).

As shown by region (v) in (a) of each of FIGS. 1, 2, 3, the upper sides at the top are all necessarily surrounded by peripheral sides, but upper sides that are fully surrounded by peripheral sides do not necessarily have to be located at the top, which is clear from the upper side of the machining unit 11 in region (iv) shown in (a) of each of FIGS. 1, 2, 3.

Figure 1A:
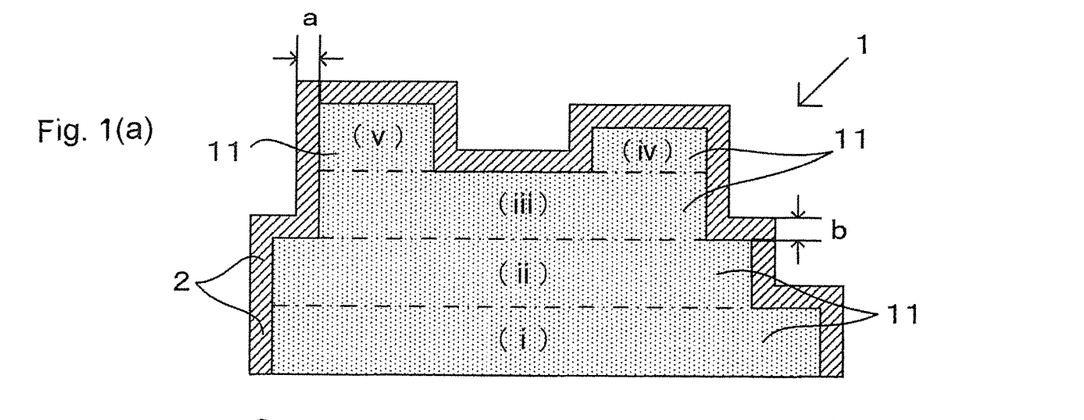
Figure 1B:
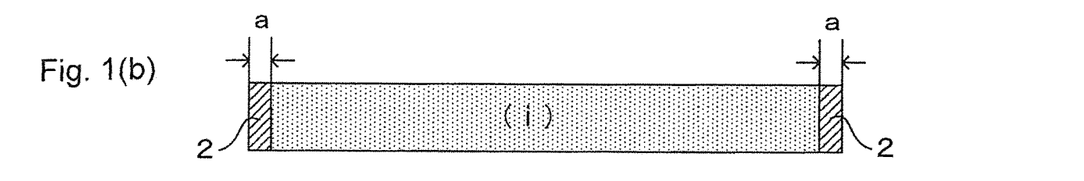
FIG. 1(b) shows the lamination step of 2(1)
Figure 1C:
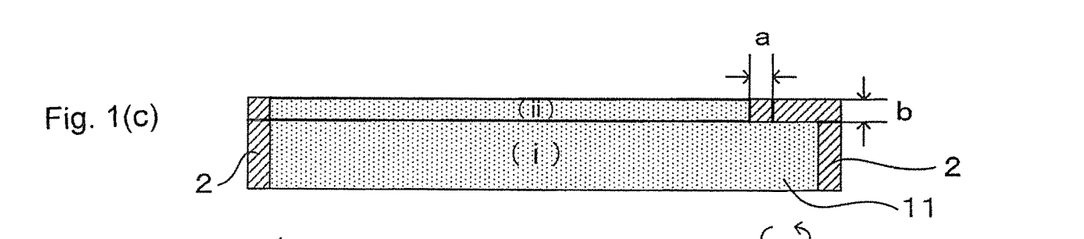
FIG. 1(c) shows the lamination step of 2(2)
Figure 1D:
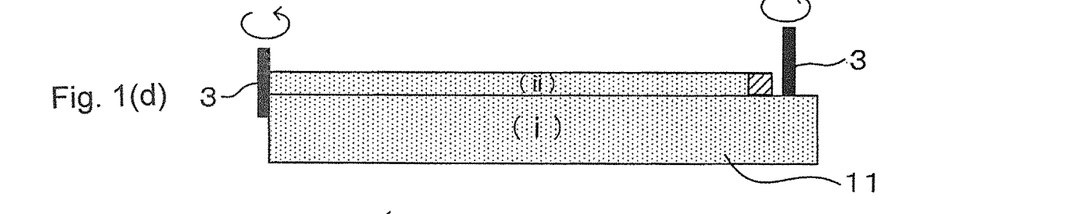
FIG. 1(d) shows the cutting step of 2(3)
Figure 1E:
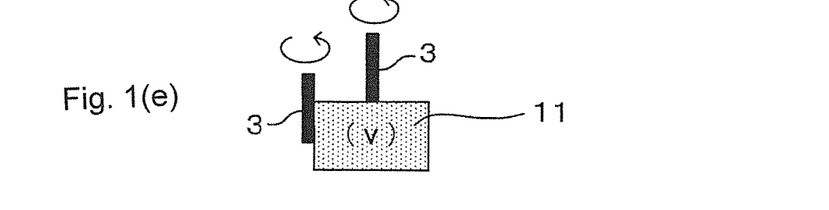
FIG. 1(e) shows the cutting step of 2(3) at the stage where the upper side of 2(1) has reached the top.

The basic configurations I, II, III have in common the aspect of step 1, as shown in (a) of FIGS. 1, 2, 3, which includes:

(1). Setting the overall shape of the object to be shaped 1 by a CAD/CAM system, and setting machining units 11 that form the overall shape and each equips a lateral periphery that is to be cut with a cutting blade on a lengthwise side section of the cutting tool 3, and an upper side that is to be cut with a cutting blade at the tip of the cutting tool 3 and is surrounded by all or a portion of the peripheral sides, (2). Setting the cutting allowance 2 for each machining unit 11 by a thickness "a" on the lateral periphery, and setting the cutting allowance 2 by a thickness "b" on the upper side.

Figures 2B, 2C, 2D, 2E, 2F:
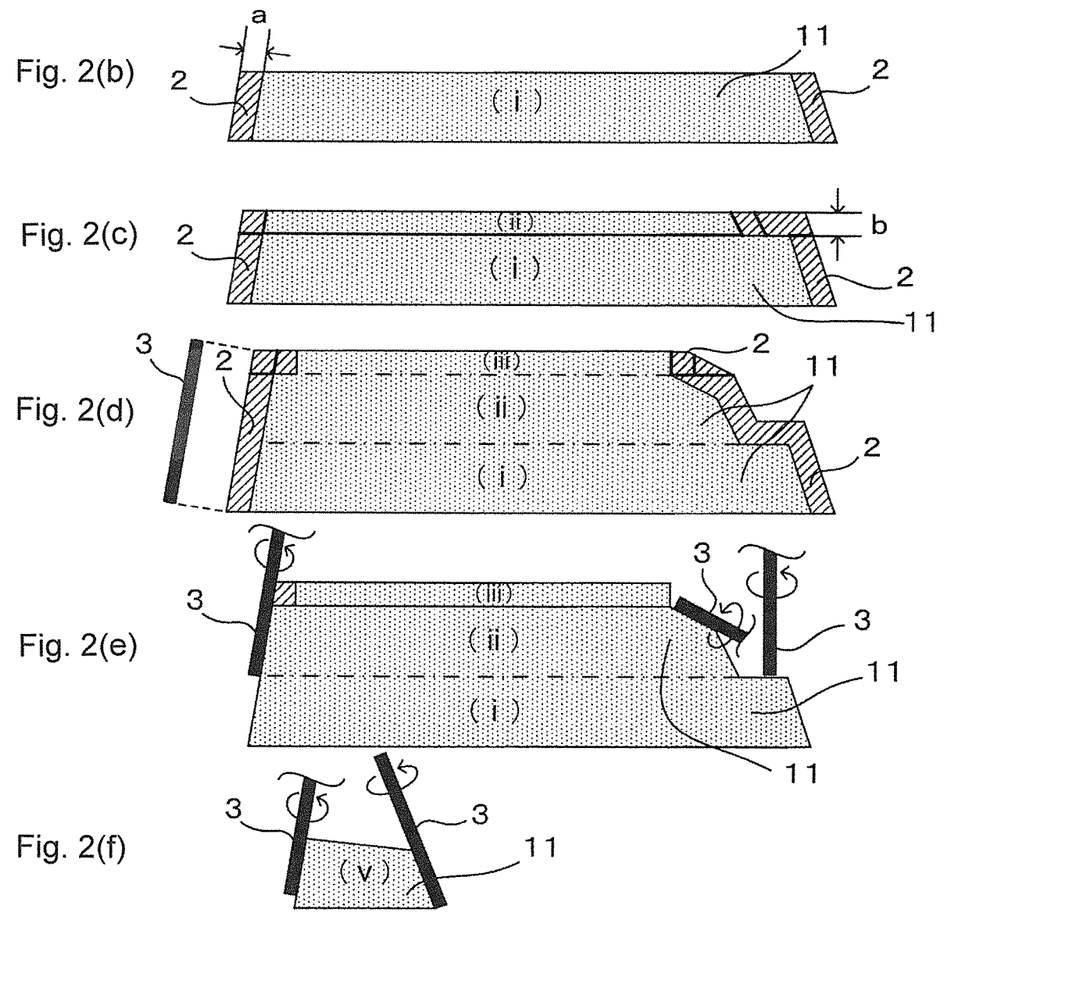
FIG. 2(b) shows the lamination step of 2(1)
FIG. 2(c) shows the lamination step of 2(2)
FIG. 2(d) shows the lamination step of 2(3) (the dotted lines at left indicate the state in which the total length of the peripheral side has reached near the inner side of the length of the cutting blade at the lengthwise side section of the cutting tool)
FIG. 2(e) shows the cutting step of 2(4)
FIG. 2(f) shows the cutting step of 2(4) when the upper side of 2(1) has reached the top.
Figure 3A:
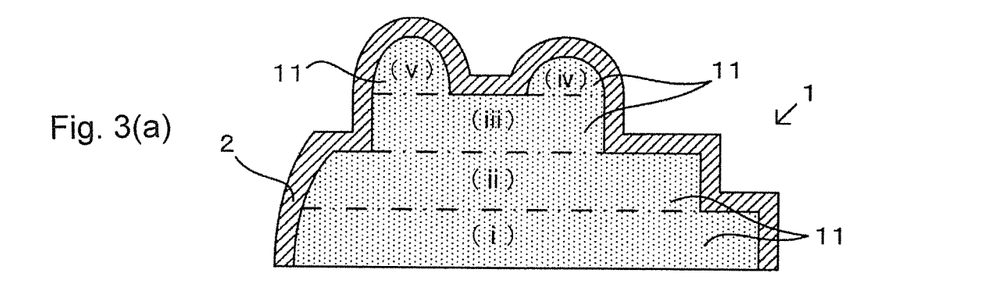
Figure 3B:
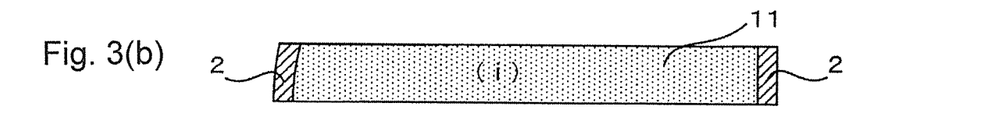
FIG. 3(b) shows the lamination step of 2(1)
Figure 3C:
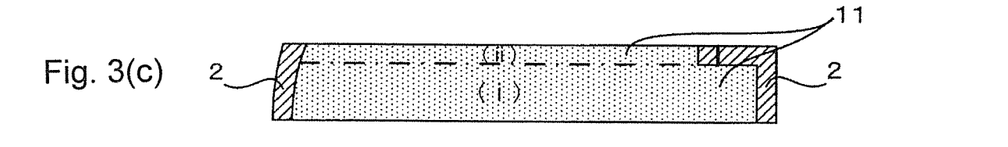
FIG. 3(c) shows the lamination step of 2(2)
Figure 3D:
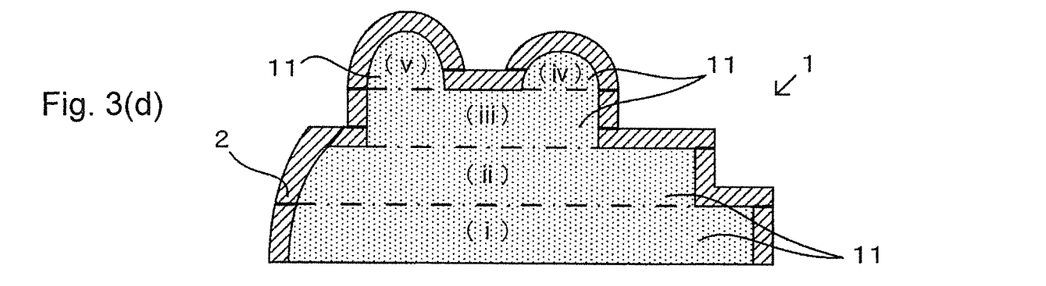
FIG. 3(d) shows the lamination step of 2(3)
Figure 3E:
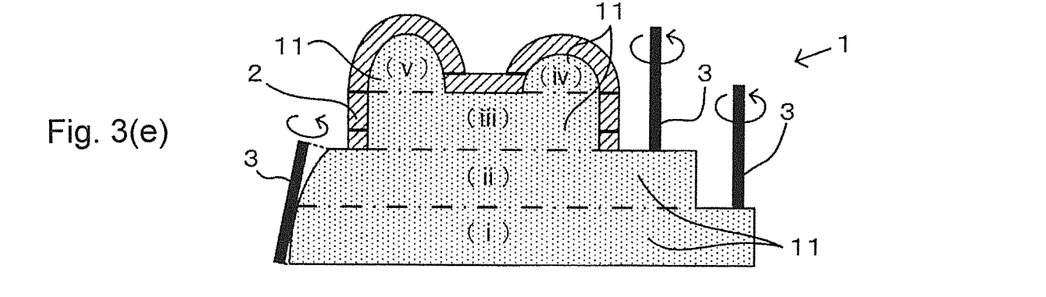
FIG. 3(e) shows the cutting step of 3 (the dotted lines at left indicate the state in which the length on the peripheral side with the longest continuous length in the direction orthogonal to the horizontal direction is equal to the length of the cutting blade at the lengthwise side section of the cutting tool used in step 3)
Figure 3F:
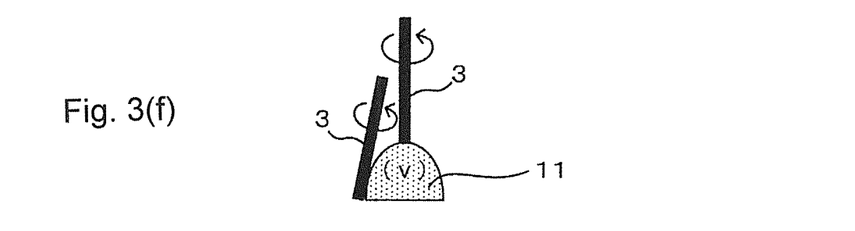
FIG. 3(f) shows the cutting step of 3 when the upper side of 2(1) has reached the top.
Figure 4:
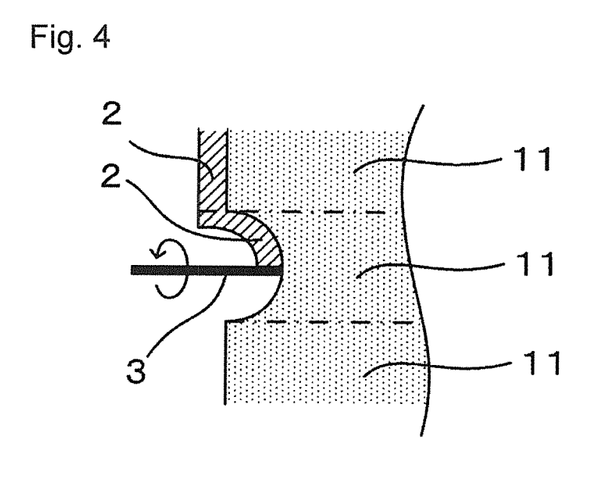
FIG. 4 is a lateral cross-sectional view showing the state of cutting in an Example.

After setting each machining unit 11 and cutting allowance 2 in step 1, the basic configurations I, II, III have in common the aspect of step 2(1), as shown in (b) of each of FIGS. 1, 2, 3, in which lamination by addition of the thickness "a" in the horizontal direction for the machining unit 11 located on the lower side, and the peripheral sides, is continued until reaching the upper side of the machining unit 11.

After continuing the lamination of step 2(1), the basic configurations I, II, III have in common the aspect of step 2(2), as shown in (c) of each of FIGS. 1, 2, 3, in which lamination based on the addition of step 2(1) on the machining unit 11 of step 2(1) and the machining units 11 located adjacent to and above the machining unit 11 in the horizontal direction, is continued in the region of the thickness "b" in the direction of the upper side, or when no machining unit 11 is present adjacent to the machining unit 11 of step 2(1), as in (iv) and (v) of the machining units 11 of (a) in each of FIGS. 1, 2, 3, lamination based on the addition of step 2(1) is continued only in the machining region of step 2(1), in the region of the thickness "b" in the direction of the upper side.

After the step of 2(2) in the basic configuration I, as shown in FIG. 1(*d*), the cutting step of 2(3) is used in which cutting is performed for the cutting allowance 2 of the thickness "a" on the peripheral sides of the machining units 11 of step 2(1) and step 2(2) and cutting of the cutting allowance 2 of the thickness "b" on the upper side, and, in the region where the peripheral side of step 2(1) and the adjacent peripheral sides of step 2(2) are continuous, cutting is performed for the cutting allowance 2 of the thickness "a" on both peripheral sides as in the peripheral sides on the left sides of machining unit 11 (i) and machining unit 11 (ii) in FIGS. 1(*c*), (*d*).

For the basic configuration I, as shown in FIG. 1(*e*), all of the steps are complete upon cutting of the top in 2(3), but shaping of the object to be shaped 1 is completed by continuing repetition of the steps of 2(1), (2), (3) from the machining unit 11 located at the lowest location until reaching the topmost machining unit 11, as described in step 3.

For the basic configuration II, after carrying out step 2(3) in which the steps of step 2(1) and (2) are repeated as shown in FIG. 2(*d*), without immediately starting the cutting step after the step of 2(2), the repetition is continued as long as the total length along the direction orthogonal to the horizontal direction of the peripheral sides formed by the repetition does not exceed the length of the cutting blade on the lengthwise side section of the cutting tool 3, and the step of 2(4) is carried out for cutting of the cutting allowance 2 of the thickness "a" on the peripheral sides formed by step (3) and cutting of the cutting allowance 2 of the thickness "b" on the upper side.

For the basic configuration II, as shown in FIG. 2(*f*), all of the steps are complete upon cutting of the top in 2(4), but shaping of the object to be shaped 1 is completed by continuing repetition of the steps of 2(1), (2), (3), (4) from the machining unit 11 located at the lowest location until reaching the topmost machining unit 11, as described in step 3.

In the basic configuration III, after step 2(2), the lamination step of 2(3) is used, in which the laminations of 2(1) and 2(2) are continuously repeated from the lowest machining unit 11 until reaching the topmost machining unit 11, as shown in FIG. 3(*d*).

In the case of the basic configuration III, as shown in FIG. 3(*e*), after having used a cutting tool 3 having a cutting blade at the lengthwise side section that is longer than the peripheral side with the longest continuous length in the direction orthogonal to the horizontal direction, of the peripheral sides formed in step 2, the step of 3 is carried out for cutting the cutting allowance 2 of the thickness "a" on the peripheral side and cutting the cutting allowance 2 of the thickness "b"

on the upper side of each machining unit 11, with shaping of the object to be shaped 1 being completed upon reaching cutting at the final stage shown in FIG. 3(*f*).

With the basic configuration I, it is impossible to avoid the possibility of unwanted sintering by further lamination carried out on the adjacent machining units 11 after the cutting step of 2(3), due to the effects of leakage of powder dispersed on the adjacent machining units 11, and sintering of the adjacent machining units 11, i.e. due to leakage of the laser beam or electron beam irradiated onto the adjacent machining units 11, onto the peripheral sides and upper sides that have already completed cutting.

Therefore, with the basic configuration III, the possibility that arises with the basic configuration I cannot arise since the cutting step of 3 is carried out after completing the lamination step with addition of all of the cutting allowances 2 on the peripheral sides and upper sides.

However, in step 3 of the basic configuration III, as shown in FIG. 3(*e*), it is essential to use a cutting tool 3 having a cutting blade on the lengthwise side section that is longer than the peripheral side with the longest continuous length in the direction orthogonal to the horizontal direction, of the peripheral sides formed in step 2.

A blade having such the lengthwise width introduces a technical drawback compared to the basic configuration I, in that a prescribed thickness of the lengthwise cross-section is necessary, and it often cannot be applied for fine molding.

However, when the overall height width of the object to be shaped 1 is small, such that the width in the direction orthogonal to the horizontal direction of the peripheral sides that are continuous by the machining units 11 can be processed by a common tool, the basic configuration III is superior in terms of the features described above, while also allowing simpler control.

The basic configuration II can produce an intermediate state between the basic configurations I and III, to the extent of the effect of lamination of the adjacent machining units 11, while being superior in terms of not requiring provision of a special cutting tool 3 as for the basic configuration III.

In most cases, the thickness "b" of the cutting allowance 2 on the upper sides is set to be thicker than the thickness "a" of the cutting allowance 2 at the peripheral sides, the reason being that for the cutting allowance 2 on the upper side, the sintered cutting allowance 2 has a high degree of heat contraction due to the load of the cutting allowance 2 region itself during the heat contraction.

The peripheral sides and the upper sides are distinguished by the cutting blade of the cutting tool 3, as already explained, and the peripheral sides are not limited to being vertical planes, and may also be slanted sides with respect to the vertical direction, or outwardly protruding curved sides with respect to the vertical direction, while the upper sides are not limited to being horizontal sides, and may also be slanted sides with respect to the horizontal direction, or curved sides with respect to the horizontal direction.

The directions of the peripheral sides and the directions of the upper sides can be distinguished by specific angles, and in most cases, they will be distinguished by a range of 60° to 75° with respect to the horizontal direction.

Cutting of the cutting allowance 2 on the peripheral sides can be realized even in a case that the peripheral sides have undercutting represented by the left wall section of (iv) of the machining units 11 of FIG. 2(*a*), for example.

That is, in the undercut region as well, after the cutting allowance 2 of the thickness "a" has been added, cutting can be carried out by moving the cutting tool 3 after setting the cutting blade on the lengthwise side section of the cutting tool 3 to the direction of undercutting, along the direction of undercutting.

In addition, during cutting of the peripheral sides, it is possible to employ a cutting mode wherein the tip of the cutting tool 3 is directed upward and the top end connected to the shank section is directed downward, as in the case of the peripheral sides on the right shoulder portion of (ii) of the machining units 11 in FIG. 2(*e*), for example.

Hereinafter, a description will be given by following examples.

Example

For this working example, when the peripheral sides form curves having shapes protruding inward with respect to the vertical direction, the cutting allowance 2 of the thickness "a" formed on the peripheral sides is shaved off with a cutting blade at the tip of the cutting tool 3.

When the outer peripheral sides form curves depressed inward with respect to the vertical direction, the peripheral sides cannot be shaved off by a blade at the side sections in the lengthwise direction of the cutting tool 3.

In consideration of such situations, this working example carries out cutting of the cutting allowance 2 in the same manner as the other peripheral sides, by using the blade at the tip of the cutting tool 3 as described above.

For this working example, even if the peripheral sides are formed in a shape depressed inward with respect to the vertical direction, it is still possible to carry out finish cutting in the same manner as the other peripheral sides.

INDUSTRIAL APPLICABILITY

By implementing the present invention, therefore, it is possible to efficiently and smoothly achieve a three-dimensional shaping method with cutting allowance, and it can be utilized for a three-dimensional shaping method for three-dimensional shaped objects having peripheral sides and upper sides with a variety of different shapes.

REFERENCE SIGNS LIST

1: Object to be shaped
11: Machining unit
2: Cutting allowance
3: Cutting tool

What is claimed is:

1. A three-dimensional shaping method wherein, after a lamination step that forms a laminate and that includes several repetitions of forming a flat surface by sliding of a squeegee onto a powder layer formed by dispersion of powder and a sintering step in which the flat surface is irradiated with a laser beam or electron beam, the laminate is subjected to cutting with a cutting tool, the three-dimensional shaping method comprising the following steps:
  1 (1) setting an overall shape of an object to be shaped by a CAD/CAM system, and setting machining units that form the overall shape and the machining units including a lateral periphery that is to be cut with a cutting blade on a lengthwise side section of the cutting tool, and an upper side that is to be cut with a cutting blade at a tip of the cutting tool and is surrounded by at least some peripheral sides, and (2) setting a cutting allowance for each machining unit by a thickness "a" on the lateral periphery, and setting a cutting allowance by a thickness "b" on the upper side thereof;

2 (1) continuing lamination by addition of the thickness "a" in a horizontal direction on the peripheral sides of the machining unit located on a lower end, until reaching the upper side of the machining unit, (2) one of:
   (a) continuing lamination based on the addition of step 2(1) on the machining unit of step 2(1) situated at the upper side of the machining unit in a region of the thickness "b" in the direction of the upper side; or
   (b) when no machining unit is situated at the upper side of the machining unit of step 2(1), finishing lamination based on the addition of step 2(1) only in the machining region of step 2(1), in a region of the thickness "b" in the direction of the upper side thereof, and (3) cutting the cutting allowance of the thickness "a" on the peripheral sides of the machining units of step 2(1) and cutting the cutting allowance of the thickness "b" on the upper sides thereof,
while in a region where the peripheral sides of the machining units of step 2(1) and peripheral sides of the machining units of step 2(2) are continuous, cutting the cutting allowance of the thickness "a" on both peripheral sides thereof; and 3 continuing repetition of step 2 from a lowest machining unit to a topmost machining unit.

2. A three-dimensional shaping method wherein, after a lamination step that forms a laminate and that includes several repetitions of forming a flat surface by sliding of a squeegee onto a powder layer formed by dispersion of powder and a sintering step in which the flat surface is irradiated with a laser beam or electron beam, the laminate is subjected to cutting with a cutting tool, the three-dimensional shaping method comprising the following steps:

1 (1) setting an overall shape of an object to be shaped by a CAD/CAM system, and setting machining units that form the overall shape and the machining units including a lateral periphery that is to be cut with a cutting blade on a lengthwise side section of the cutting tool, and an upper side that is to be cut with a cutting blade at a tip of the cutting tool and is surrounded by at least some peripheral sides, and (2) setting a cutting allowance for each machining unit by a thickness "a" on the lateral periphery, and setting a cutting allowance by a thickness "b" on the upper side;

2 (1) continuing lamination by addition of the thickness "a" in a horizontal direction on the peripheral sides of the machining unit located on a lower end, until reaching the upper side of the machining unit, (2) one of:
   (a) continuing lamination based on the addition of step 2(1) on the machining unit of step 2(1) situated at the upper side of the machining unit in a region of the thickness "b" in the direction of the upper side; or
   (b) when no machining unit is situated at the upper side of the machining unit of step 2(1), finishing lamination based on the addition of step 2(1) only in the machining region of step 2(1), in a region of the thickness "b" in the direction of the upper side thereof, and (3) repeating steps 2(1) and 2(2), and continuing repetition of steps 2(1) and 2(2) as long as a total length along a direction orthogonal to the horizontal direction of the peripheral sides formed by the repetition does not exceed a length of the cutting blade on the lengthwise side section of the cutting tool, and (4) cutting the cutting allowance of the thickness "a" on the peripheral sides of each machining unit in which lamination is finished in step 2(3) and cutting the cutting allowance of the thickness "b" on the upper side thereof
while in a region where the peripheral sides of the machining units in which lamination is finished and the peripheral sides of the machining unit positioned at the next upper side in which lamination are not finished are continuous, cutting the cutting allowance of the thickness "a" on both peripheral sides thereof; and 3 continuing repetition of step 2 from a lowest machining unit to a topmost machining unit.

3. A three-dimensional shaping method wherein, after a lamination step that forms a laminate and that includes several repetitions of forming a flat surface by sliding of a squeegee onto a powder layer formed by dispersion of powder and a sintering step in which the flat surface is irradiated with a laser beam or electron beam, the laminate is subjected to cutting with a cutting tool, the three-dimensional shaping method comprising the following steps:

1 (1) setting an overall shape of an object to be shaped by a CAD/CAM system, and setting machining units that form the overall shape and the machining units including a lateral periphery that is to be cut with a cutting blade on a lengthwise side section of the cutting tool, and an upper side that is to be cut with a cutting blade at a tip of the cutting tool and is surrounded by at least some peripheral sides, and (2) setting a cutting allowance for each machining unit by a thickness "a" on the lateral periphery, and setting a cutting allowance by a thickness "b" on the upper side thereof;

2 (1) continuing lamination by addition of the thickness "a" in a horizontal direction on the peripheral sides of the machining unit located on a lower end, until reaching the upper side of the machining unit, (2) one of:
   (a) continuing lamination based on the addition of step 2(1) on the machining unit of step 2(1) situated at the upper side of the machining unit in a region of the thickness "b" in the direction of the upper side; or
   (b) when no machining unit is situated at the upper side of the machining unit of step 2(1), finishing lamination based on the addition of step 2(1) only in the machining region of step 2(1), in a region of the thickness "b" in the direction of the upper side thereof, and (3) continuing repetition of the lamination of steps 2(1) and 2(2) from a lowest machining unit to a topmost machining unit; and 3 cutting the cutting allowance of the thickness "a" on the peripheral side and cutting the cutting allowance of the thickness "b" on the upper of each machining unit, after using a cutting tool having a cutting blade at the lengthwise side section that is longer than the peripheral side with a longest continuous length in a direction orthogonal to the horizontal direction, of the peripheral sides formed in step 2.

4. The three-dimensional shaping method according to claim 1, wherein the thickness "b" is set to be greater than the thickness "a".

5. The three-dimensional shaping method according to claim 1, wherein the peripheral sides of the machining units form not only sides along a vertical direction, but also one of:
slanted sides,
outwardly protruding curved sides or
both slanted sides and outwardly protruding curved sides
with respect to the vertical direction.

6. The three-dimensional shaping method according to claim 1, wherein the upper sides of the machining units form not only horizontal sides, but also one of:
slanted sides,
curved sides or
both slanted sides and curved sides
with respect to the horizontal direction.

7. The three-dimensional shaping method according to claim 1, wherein the peripheral sides and upper sides are distinguished by angles thereof with respect to the horizontal direction.

8. The three-dimensional shaping method according to claim 7, wherein the distinguishing angles are in a range of 60° to 75° with respect to the horizontal direction.

9. The three-dimensional shaping method according to claim 1, wherein when the peripheral sides form curves having shapes protruding inward with respect to a vertical direction, the cutting allowance of the thickness "a" formed on the peripheral sides is shaved off with a cutting blade at the tip of the cutting tool.

10. The three-dimensional shaping method according to claim 2, wherein the thickness "b" is set to be greater than the thickness "a".

11. The three-dimensional shaping method according to claim 2, wherein the peripheral sides of the machining units form not only sides along a vertical direction, but also one of:
slanted sides,
outwardly protruding curved sides or
both slanted sides and outwardly protruding curved sides
with respect to the vertical direction.

12. The three-dimensional shaping method according to claim 2, wherein the upper sides of the machining units form not only horizontal sides, but also one of:
slanted sides,
curved sides or
both slanted sides and curved sides
with respect to the horizontal direction.

13. The three-dimensional shaping method according to claim 2, wherein the peripheral sides and upper sides are distinguished by angles thereof with respect to the horizontal direction.

14. The three-dimensional shaping method according to claim 13, wherein the distinguishing angles are in a range of 60° to 75° with respect to the horizontal direction.

15. The three-dimensional shaping method according to claim 2, wherein when the peripheral sides form curves having shapes protruding inward with respect to a vertical direction, the cutting allowance of the thickness "a" formed on the peripheral sides is shaved off with a cutting blade at the tip of the cutting tool.

16. The three-dimensional shaping method according to claim 3, wherein the thickness "b" is set to be greater than the thickness "a".

17. The three-dimensional shaping method according to claim 3, wherein the peripheral sides of the machining units form not only sides along a vertical direction, but also one of:
slanted sides,
outwardly protruding curved sides or
both slanted sides and outwardly protruding curved sides
with respect to the vertical direction.

18. The three-dimensional shaping method according to claim 3, wherein the upper sides of the machining units form not only horizontal sides, but also one of:
slanted sides,
curved sides or
both slanted sides and curved sides
with respect to the horizontal direction.

19. The three-dimensional shaping method according to claim 3, wherein the peripheral sides and upper sides are distinguished by angles thereof with respect to the horizontal direction.

20. The three-dimensional shaping method according to claim 19, wherein the distinguishing angles are in a range of 60° to 75° with respect to the horizontal direction.

21. The three-dimensional shaping method according to claim 3, wherein when the peripheral sides form curves having shapes protruding inward with respect to a vertical direction, the cutting allowance of the thickness "a" formed on the peripheral sides is shaved off with a cutting blade at the tip of the cutting tool.

* * * * *